United States Patent [19]

Cizewski et al.

[11] Patent Number: 5,156,363

[45] Date of Patent: Oct. 20, 1992

[54] HELICOPTER COLLECTIVE STICK OF THE DISPLACEMENT TYPE OCCUPYING A MINIMUM SPACE ENVELOPE YET WHOSE GRIP GENERATES AN ARC OF LARGE RADIUS

[75] Inventors: Steven C. Cizewski, Wallingford; William F. Lange, Woodbridge; James N. Rozak, Cheshire, all of Conn.

[73] Assignee: United Technologies Corporation, Hartford, Conn.

[21] Appl. No.: 661,940

[22] Filed: Feb. 28, 1991

[51] Int. Cl.⁵ .............................................. B64C 13/04
[52] U.S. Cl. .................................... 244/223; 244/229; 244/232; 244/236; 244/234
[58] Field of Search ............... 244/223, 229, 222, 232, 244/75 R, 220, 236, 234, 17.13; 74/479, 480 R

[56] References Cited

U.S. PATENT DOCUMENTS

| | | | |
|---|---|---|---|
| 2,163,114 | 6/1939 | Ziegler | 244/84 |
| 2,736,518 | 2/1956 | Degenfelder | 244/223 |
| 3,002,714 | 10/1961 | Decker | 244/223 |
| 3,286,958 | 11/1966 | Moran | 244/84 |
| 3,611,828 | 10/1971 | Maroschick | 244/229 |
| 3,747,876 | 7/1973 | Fortna et al. | 244/223 |
| 3,773,282 | 11/1973 | Sands et al. | 244/223 |
| 4,039,162 | 8/1971 | Calhoun et al. | 244/232 |
| 4,345,195 | 9/1982 | Griffith et al. | 244/223 |
| 4,420,808 | 12/1983 | Diamond et al. | 364/434 |
| 4,696,445 | 9/1987 | Wright et al. | 244/229 |

Primary Examiner—Joseph F. Peters, Jr.
Assistant Examiner—Christopher P. Ellis
Attorney, Agent, or Firm—Vernon F. Hauschild

[57] ABSTRACT

A helicopter collective control stick having a pilot grip positioned by a linkage assembly whose kinematics permits the control stick to occupy a small envelope and to have the pilot grip motion to be about a large radius. Our collective stick includes a biasing member to balance the control stick and linkage in the mid collective position and which provides a force gradient when the control stick is moved from the mid collective or trimmed position. Further, our collective stick is operable in concert with the full authority side arm controller to operate in either a tracking or a command mode.

18 Claims, 5 Drawing Sheets

HELICOPTER COLLECTIVE STICK OF THE DISPLACEMENT TYPE OCCUPYING A MINIMUM SPACE ENVELOPE YET WHOSE GRIP GENERATES AN ARC OF LARGE RADIUS

TECHNICAL FIELD

This invention relates to helicopter control systems and more particularly to those utilizing a displacement type collective control stick designed to occupy minimum space envelope yet whose grip generates an arc of large radius, and which is usable in concert with a side arm multi-axis force/displacement type control stick.

BACKGROUND OF THE INVENTION

Traditional helicopter control systems employ a cyclic stick for longitudinal and lateral blade pitch control, pedals for directional yaw control and a pivotable collective stick for collective blade pitch or lift control. With advancement in technology, these control functions were combined into a single control stick of the type disclosed in Diamond et al U.S. Pat. No. 4,420,808, issued in 1983 and owned by Assignee, which discloses a single side arm controller that provides control signals in each of the pitch, roll, yaw, and collective/lift axes of a helicopter control system. The stick is essentially a "force" stick and there is limited displacement of the stick in each axis. Such a control stick is typically used in a fly-by-wire flight control system. Because of the minimal displacement of this control stick, there is little tactile feedback from the stick to the pilot, particularly in the collective channel, so as to permit the pilot to accurately perceive the extent of collective pitch input and, hence, the amount of collective pitch reserve available to the pilot without diverting pilot attention to a secondary cue within the cockpit, such as torque or collective position indicators. The proprioceptive cues received by the pilot from the Diamond et al single side arm controller are adequate for yaw and cyclic pitch maneuvers in as much as the helicopter's agility and response is nearly instantaneous in response to stick movement, since little energy is required to bank or yaw the helicopter. However, the helicopter's lift/collective Z-axis response necessitates a substantial change in the energy state and is characterized by a long time constant. Therefore, in the absence of a physical cue which may be sensed by the pilot, such as control stick displacement, the full authority multi-axis single side arm controller of Diamond et al is not particularly well suited to rotor craft which must perform in a flight mode in which the tactile feedback or pilot feel is critical in the collective channel, such as aircraft to be used in nap-of-the-earth flights.

To accommodate aircraft which must perform these collective pitch sensitive flights, Wright et al U.S. Pat. No. 4,696,445, granted in 1987 and owned by Assignee, utilized a separate collective stick in concert with the side arm controller in which the pilot has the option of effecting all helicopter controls through the side arm controller or using the separate collective stick to control collective pitch during collective channel sensitive flights. The displacement collective control stick disclosed in the Wright et al patent is the conventional pivotal type consisting of a pilot grip positioned at the end of a long stick member which is pivotally connected at its opposite end to a fixed point in the aircraft. This lengthy prior art collective stick has the advantage that the pilot grip moves about a large radius such that its motion is virtually linear. The advantage of this virtually linear motion of the hand grip of the collective stick is that it reduces the pilot fatigue caused by excessive wrist articulation in that it makes it easier for the pilot to locate and operate the various push-button controls positioned on the face of the hand grip.

While this displacement type collective stick offers the pilot the desired physical displacement cues indicative of the magnitude of collective input, it occupies substantial space in the cockpit since the stick is approximately two feet long. Therefore, a collective stick of this prior art type is not acceptable in certain modern helicopters in which the objective is to down size the cockpit.

DISCLOSURE OF THE INVENTION

It is therefore an object of our invention to provide a displacement type collective stick whose kinematics result in a control stick of reduced envelope, yet one in which the motion of the grip portion of the collective stick is about a large radius so as to reduce the wrist articulation required of the pilot and to give the pilot the same "feel" he experienced when operating the earlier lengthy collective sticks.

It is still a further object of our invention to teach such a collective stick of reduced envelope and large radial motion and which is usable in concert with a full authority multi-axis side arm controller. Our improved control stick is operable in a tracking mode to track the collective pitch control signal of the side arm controller so as to give the pilot a proprioceptive cue as to the collective pitch being called for by the side arm controller, and also an indication of the remaining available helicopter lift command through increased collective pitch. Our collective stick can be also used independently of the side arm controller.

It is still a further object of this invention to teach such a collective stick which is motor driven during its tracking mode and which motor is operable during its collective stick control mode to provide damping and a spring gradient feel since the pilot in moving the collective stick must overcome the torque of the motor.

It is still a further object of this invention to teach such a collective stick which includes biasing means to negate the weight of the collective stick and grip member, and maintain a collective stick and grip member trim position, and to provide increased resistance as the pilot moves the collective stick from its collective trimmed position so as to provide the pilot with feel for the amount of collective pitch being called for by the control stick from the trimmed position.

It is still a further object of this invention to teach such a collective control stick which accomplishes the desired large radius grip motion without the use of sliding members which are susceptible to binding problems and are not ballistically tolerant.

It is a further object of this invention to teach such a collective control stick in which the linkage assembly which controls the motion of the stick grip includes six links of selected length and which are pivotally connected at selected positions so that the kinematics of the linkage assembly, while occupying a small space envelope, produces collective stick grip motion about a large radius to reduce pilot wrist articulation.

It is still a further object of this invention to teach such a collective stick including a linkage assembly which is motor driven to maintain the control stick in its collective trimmed position and which includes balance springs operatively associated with the linkage mechanism and operable to reduce the power requirements of the electric drive motor and to mitigate control anomalies during mode transitions.

Other objects, features and advantages of the invention will become apparent in light of the following description thereof.

BEST MODE FOR CARRYING OUT THE INVENTION

Figure 1:
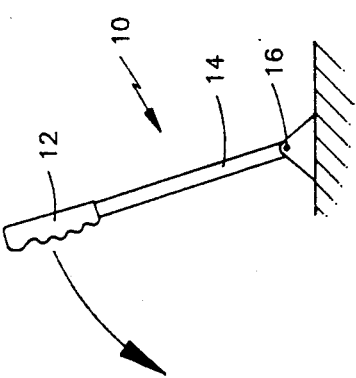
FIG. 1 is a showing of the prior art helicopter collective pitch control stick.

The conventional helicopter collective control stick is shown as 10 in FIG. 1 and consists of a pilot grip 12 positioned at the outboard end of a long stick member 14, which is pivoted at 16 to a fixed station in the helicopter. This prior art control stick is about 24 inches long. This prior art collective stick has the advantage that the stick position gives the pilot a physical cue as to the amount of collective pitch being called for and, therefore, the amount of additional collective pitch available upon pilot command. Such a stick also has the advantage of moving in an arc about a large radius so that this motion is virtually linear, thereby reducing the wrist articulation required of the pilot in operating the collective stick and the control buttons conventionally positioned on the forward side thereof.

Our improved collective control stick retains this large radius motion of the pilot grip so that in using our improved control stick, the pilot will not be experiencing a new control stick motion which will require attendant adjustments thereto.

Figure 2:
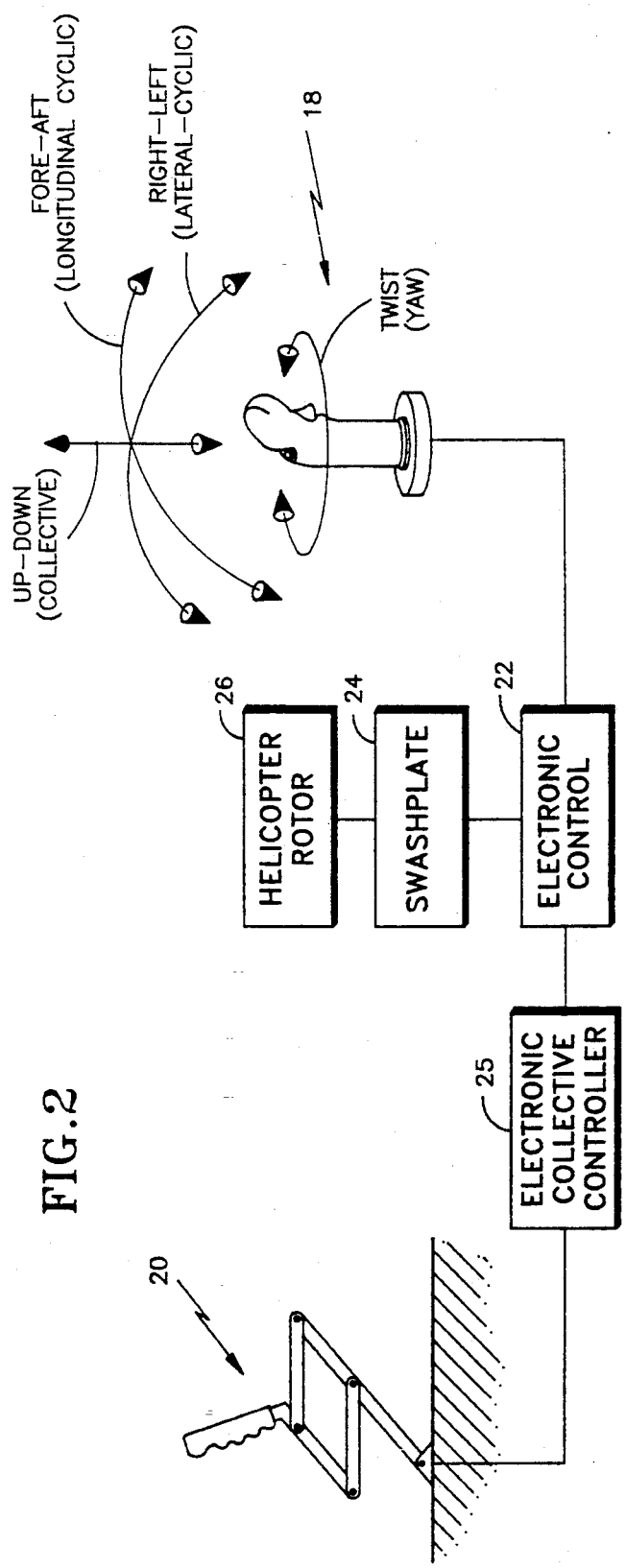
FIG. 2 is showing of our minimum space envelope helicopter collective pitch control stick used in combination with a full authority side arm controller to work through a conventional electronic control to control the helicopter swashplate which in turn controls helicopter blade pitch.

Our improved collective control stick is preferably used in concert with a full authority side arm controller as shown in FIG. 2.

Viewing FIG. 2, we see the full authority side arm controller 18 which in conventional fashion controls helicopter collective pitch by an up and down motion, longitudinal cyclic pitch by a fore and aft motion, lateral cyclic pitch by a left and right motion, and yaw by a twisting motion. Full authority side arm controller 18 is operatively connectable to our improved collective stick 20 through a conventional electronic control shown at 22 which serves to position swashplate 24 and hence the pitch of the blades of rotor 26 as commanded by either side arm controller 18 or collective stick 20. Electronic control 22 may be of the type more fully disclosed in Wright et al U.S. Pat. No. 4,696,446. Electronic collective controller 25 is positioned between electronic control 22 and collective stick 20 and serves to dynamically control collective stick 20, and conditions the electronic signals which go between control 22 and electronic controller 25.

In a fashion to be described in greater particularity hereinafter, electronic control 22 can connect the side arm controller 18 to the collective stick 20 such that the collective stick is placed in a tracking mode. In this mode, the stick tracks the collective pitch signal being given by the side arm controller 18 thereby providing the pilot with a physical cue as to the amount of collective pitch at which the helicopter rotor is presently operating and consequently the amount of remaining or reserve collective pitch available. Electronic controller 22 can also place cyclic stick 20 in a control mode in which it operates free of the side arm controller 18 and serves to control the collective pitch signal to the helicopter rotor blades independently of the side arm controller.

Figure 3:
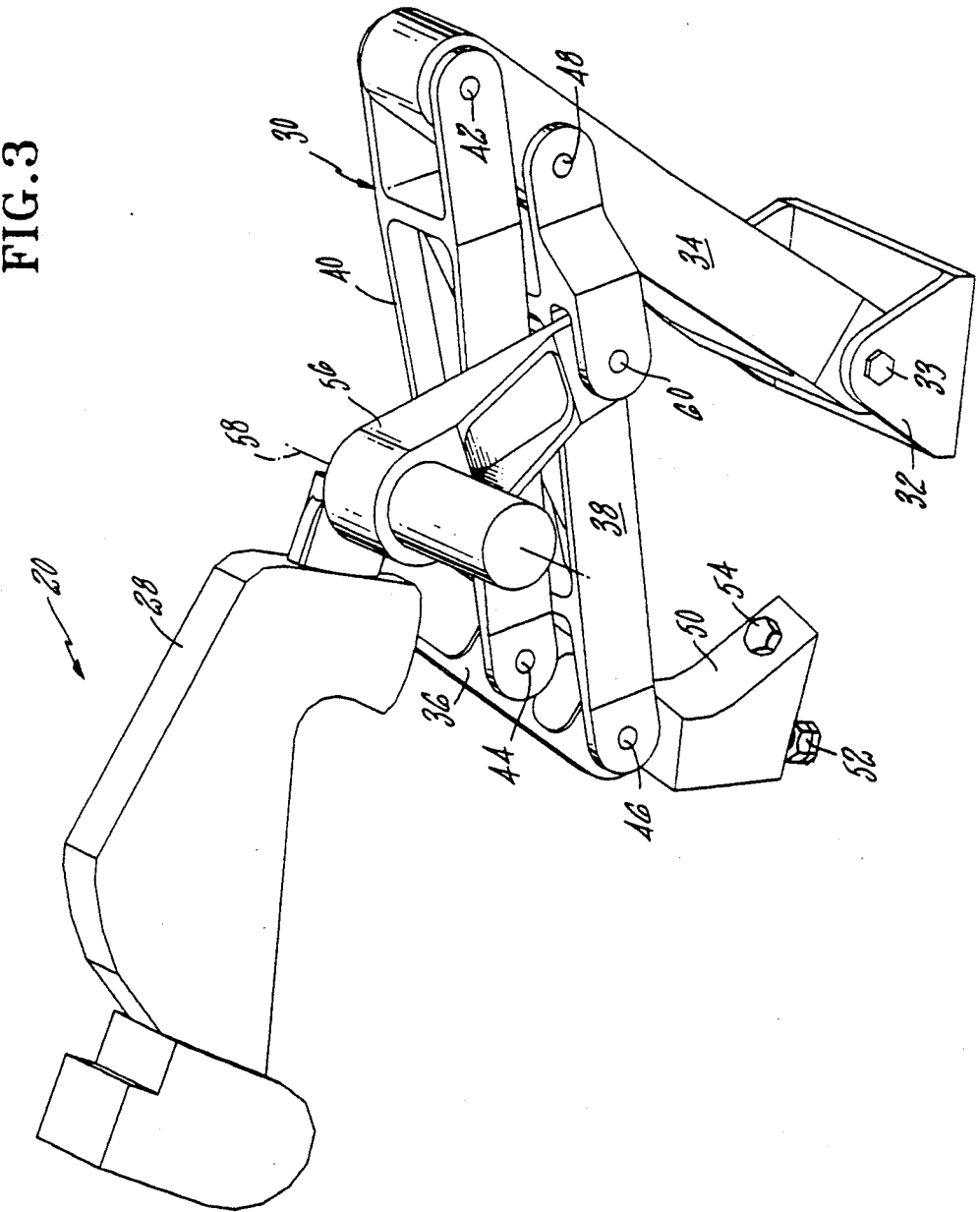
FIG. 3 is a perspective showing, with parts removed for clarity, showing our reduced space envelope helicopter collective control stick.

Our minimum envelope collective stick is shown in greater particularity in FIG. 3 which shows collective stick 20, with some of its hardware broken away for purposes of aiding this description. Collective stick 20 consists of pilot grip member 28, which is connected to linkage assembly 30, which is in turn connected to a fixed platform 32 in the helicopter cockpit. Linkage assembly 30 comprises link member 34 which is pivotally connected at one of its ends to support frame 32, at pivot connection 33, link member 36 which is connected at one of its ends to pilot grip 28 and which extends substantially parallel to link 34. Linkage assembly 30 further includes substantially parallel link members 38 and 40. Link 40 is pivotally connected at pivot point 42 to one end of link 34, and at pivot point 44 to link 36 at substantially a mid station between the opposite ends of link 36. Link 38 is pivotally connected at pivot point 46 to one end of link 36 and at pivot point 48 to a mid station along link 34.

One end of link 36 carries stop support 50 which includes low collective pitch limit stop 52 and high collective pitch limit stop 54. Collective stick 20 is shown in its lowest collective position in FIG. 3 with stop 52 positioned against the cockpit floor, or any appropriate fixed surface. High collective pitch stop 54 bears against link 38 when collective stick 20 is in its highest collective pitch position to prevent stick motion therebeyond.

Linkage assembly 30 is caused to actuate and move pilot grip 28 by the rotation of input link or crank 56 about its axis 58. Input crank 56 can be driven either in clockwise or counterclockwise direction by a motor or other means as described hereinafter. The end of input link or crank 56 is pivotally connected at pivot point 60 to link 38. In operation, when input crank 56 is caused to move in counterclockwise direction, link 38, 40 and 34 commence to move in counterclockwise direction, and then in a clockwise direction to cause link 36 to move pilot grip 28. The kinematics of linkage assembly 30 is that by selectively choosing link lengths and the location of the various pivot points between the links, the distance and the direction of pilot grip 28 movement can be precisely defined. In our control stick, pilot grip 28 moves about a large radius so that the movement simulates the pilot stick motion of the prior art collective link shown in FIG. 1.

While other dimensions may be used with our linkage assembly 34, we have found that for our desired ten inch travel of pilot grip 28, the distance between end pivot points 33 and 42 of link 34 should be 6.26 inches, for link 38 between pivot points 46 and 48 should be 7.13 inches, for link 40 between pivot points 44 and 42 should be 6.98 inches. Link 38 should pivotally connect to link 36, a distance of 6.26 inches from the link 36 connection to the pilot grip member 28.

Further, the distance between the pivot points 58 and 60 of input crank 56 should be 3.18 inches, and the pivot crank should connect to link 38 at a station 2.36 inches from pivot point 48, while the distances between pivot points 42 and 48 should be 1.57 inches and between pivot points 44 and 46 should be 1.76 inches.

This results in a collective stick so having a space envelope of 10.00 height, 9.00 length, and 7.00 width.

Input crank 56 is preferably motor operated and the manner in which this occurs will now be explained as shown in FIGS. 4 through 7.

Electric motor 60 is driven electrically by the electronic collective controller 25 to reflect the collective position of the rotor head as commanded by the side arm controller 18, and to provide damping and trim forces for the pilot when the pilot is placing collective inputs through the collective controller 25.

Electric motor 60 is connected to and drives gear member 62, which in turn drives continuous chain link 64. Chain 64 passes over and drives motor drive gear 66, which is supported for rotation with drive shaft 68 in fixed bearings 70 and 72, which are supported in fixed bulkheads 74 and 76. Chain 64 also passes over idler gear 80. Accordingly, as electric motor 60 drives gear 62, chain 64 in turn drives motor drive gear 66 and drive shaft 68 so as to cause link 56 to move in either a clockwise or counterclockwise direction as commanded by the motor. This causes linkage 30 to actuate and move pilot grip 28 either in an increased collective pitch or decreased collective pitch motion. Idler gear 80 is connected to rotary variable displacement transducer (RVDT) 82, which sends an electric signal back, to the electronic controller 22 indicating the position of the collective stick 20. Motor 60 also has RVDT 83 operatively connected thereto to also send such a second, redundant signal indicating collective stick position back to controller 22.

Figure 4:
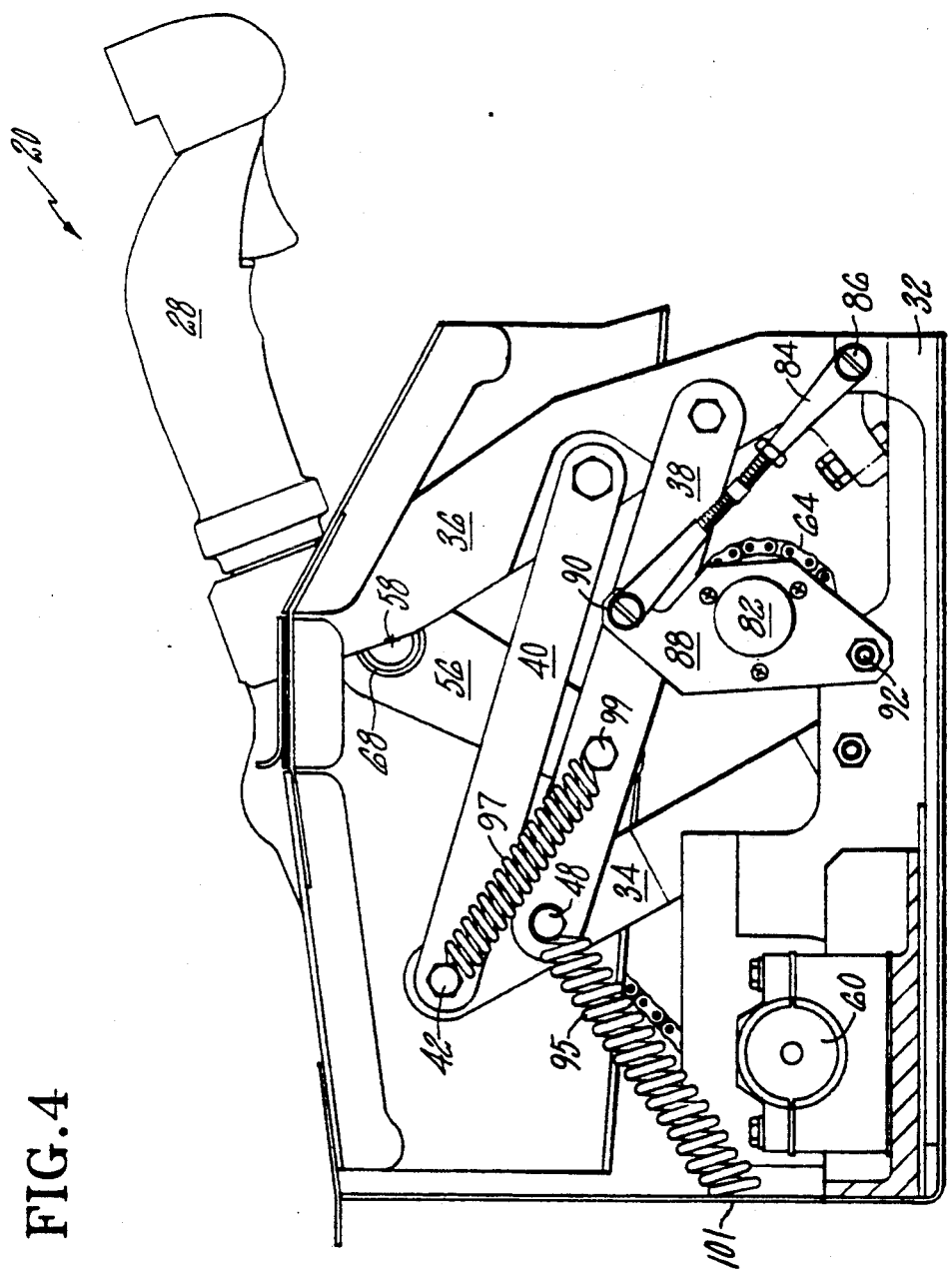
FIG. 4 is a side view of our improved collective stick showing the balance springs and a portion of the stick control mechanism.
Figure 5:
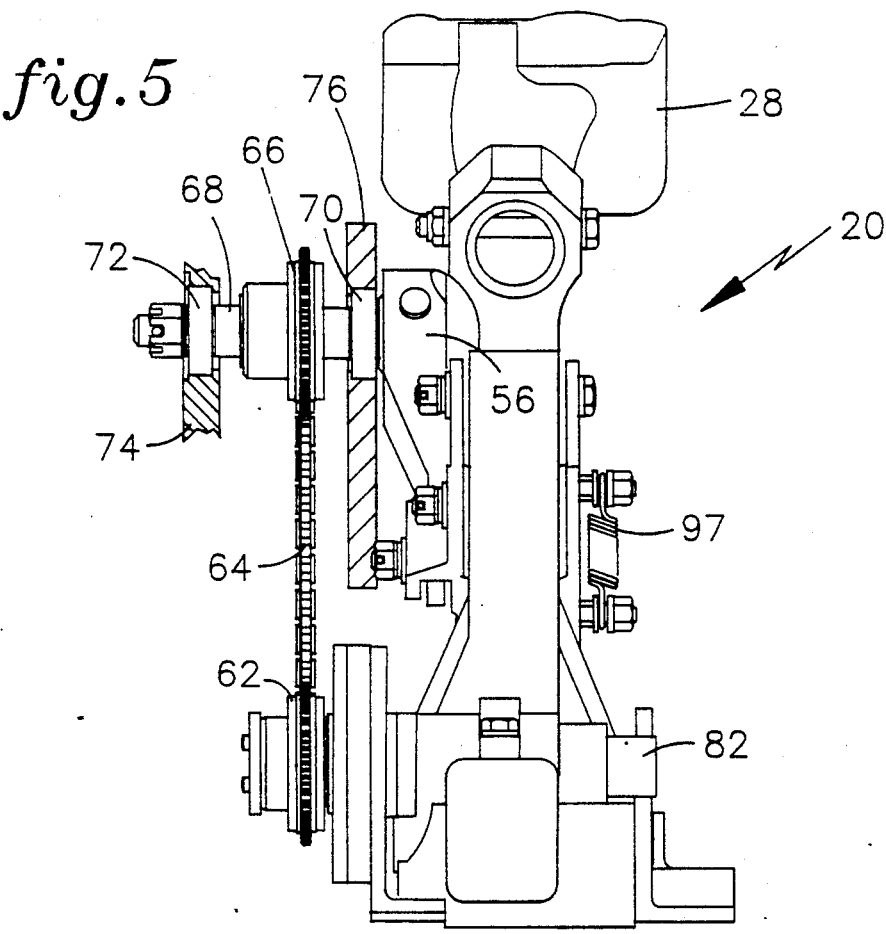
FIG. 5 is an end view of the FIG. 4 construction partly broken away and partly in section.

As best shown in FIG. 4, the tension of chain 64 can be altered by the action of adjustable link 84, which is pivotally connected to frame 32 at pivot point 86 and to plate member 88 at pivot point 90. Plate member 88 is pivotally connected to frame 32 at pivot point 92 and, since there is a similar plate member 88 adjacent idler gear 80 which is connected to and acts with the plate 88 shown in FIG. 4, a change in the length of adjustable link 84 will cause plate members 88 to rotate about pivot point 92 and hence change the tension on the chain 64.

Utilizing this construction, when the collective stick 20 is in the tracking mode, motor 60 is driven by the collective signal from the side arm controller 18 through the electronic controllers 22 and 25 and acts through gear 62 to drive chain 64, which in turn drives input gear 66 and input shaft 68 to rotate input crank 56, thereby causing the required actuation of link assembly 30 to cause the pilot grip member 28 to track the rotor head collective position as commanded by the side arm controller 18.

In the alternative, the pilot may decide to operate collective stick 20 in the control mode. This is accomplished by the pilot gripping collective stick 20 and actuating bar switch 94 which deactivates the collective control of the side arm controller 18 and activates the control of the collective stick 20 so that pilot actuation of grip portion 28 of the collective stick 20 will then be controlling the collective pitch of the helicopter blades. When in the control mode, motor 60 provides damping for the collective stick 20, and a spring gradient feel since when the pilot moves the collective stick 20, he has to use sufficient force to overcome the torque of motor 60. This feature is maintained in our construction so that the pilot will be experiencing the same feel that he would have experienced if he were using the prior art lengthy single lever collective stick.

In addition, when the pilot gets to a given collective pitch position which he wishes to maintain, he may hit trim switch 96 which sends a signal to the electronic collective controller 25 and the electronic control 22 to maintain the present degree of collective pitch. Again, when the pilot attempts to move the collective pitch from the selected trim position, he feels a gradient resistance due to the varying torque of the motor, which is resisting the stick motion because it is still acting under the trim command.

In our preferred embodiment, we include two balance springs 95 and 97 shown in FIG. 4. Balance spring 97 is connected at pivot point 42 to links 40 and 36, and also to link 38 at point 99. Spring 95 is connected at connecting point 48 to links 38 and 34 with its opposite end connected to a fixed station 101 in the cockpit.

Springs 95 and 97 are of the coil variety and are sized to always be preloaded and to balance collective stick 20 in its mid-collective position. This preloading of springs 95 and 97 negates the weight of the collective stick 20. Further, as stick 20 is moved from its mid-collective position, one of the springs will elongate to provide a physical cue to the pilot due to a spring gradient which increases as the pilot moves the stick further from the mid-collective position. By balancing stick 20 in its mid-collective position, and providing the aforementioned spring gradient, balance springs 95 and 97 provide the advantages of increasing the life of electric motor 60 by reacting the weight of control stick 20 and more uniformly distributing the force characteristics of linkage assembly 30, enabling smooth transition from the tracking mode to the control mode, or vice versa, in that the springs 95 and 97 do not permit a sudden force deficit from the tracking mode to the control mode or engine damping mode and, finally, the springs generate high force gradients at the high and low collective positions thereby providing feedback to the pilot by way of a physical cue that his stick is approaching these extreme high and low collective pitch input positions. Another advantage gained by using springs 95 and 97 is that they avoid induction by the electric motor 60 of an undesirable force gradient when the pilot has his hand on the collective stick.

Figure 8:
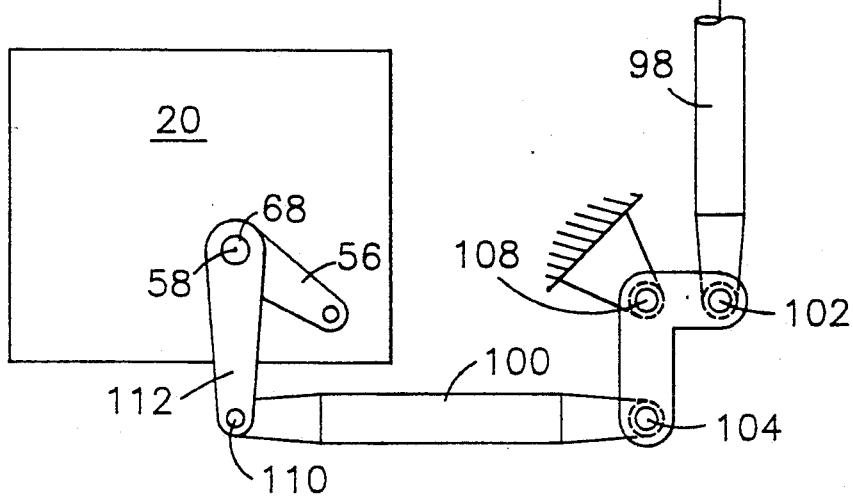
FIG. 8 discloses manual means for operating our improved control stick or indicating the position thereof.
Figure 6:
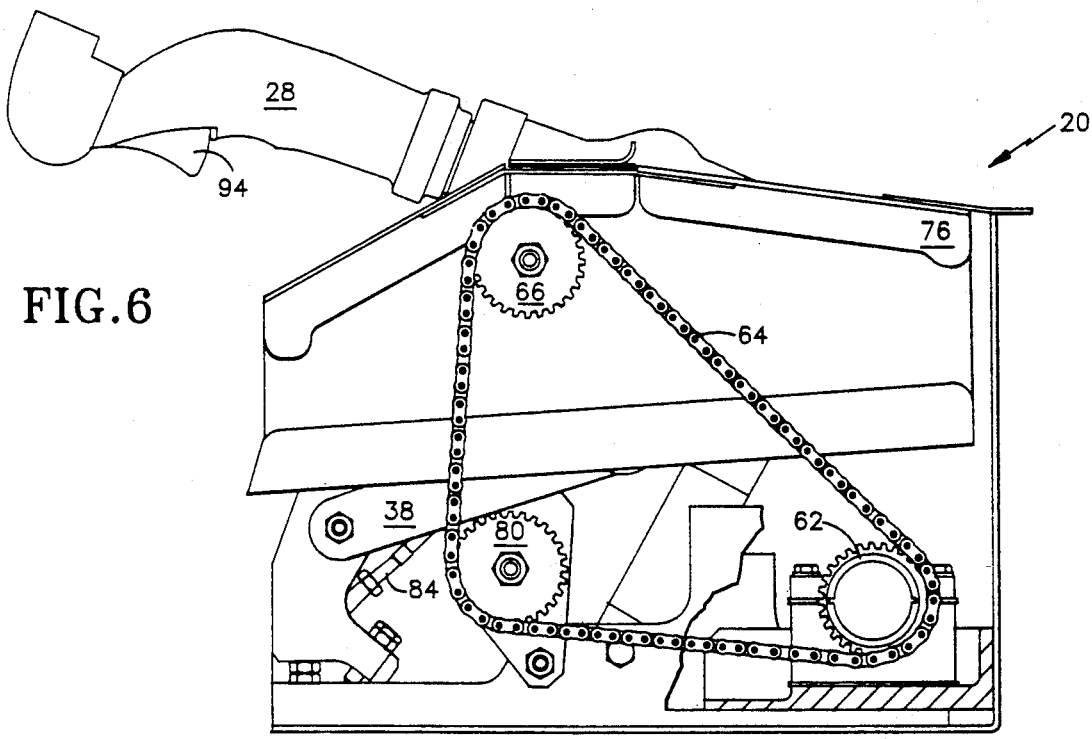
FIG. 6 is a side view of our improved collective stick taken from the opposite side from the FIG. 4 showing.
Figure 7:
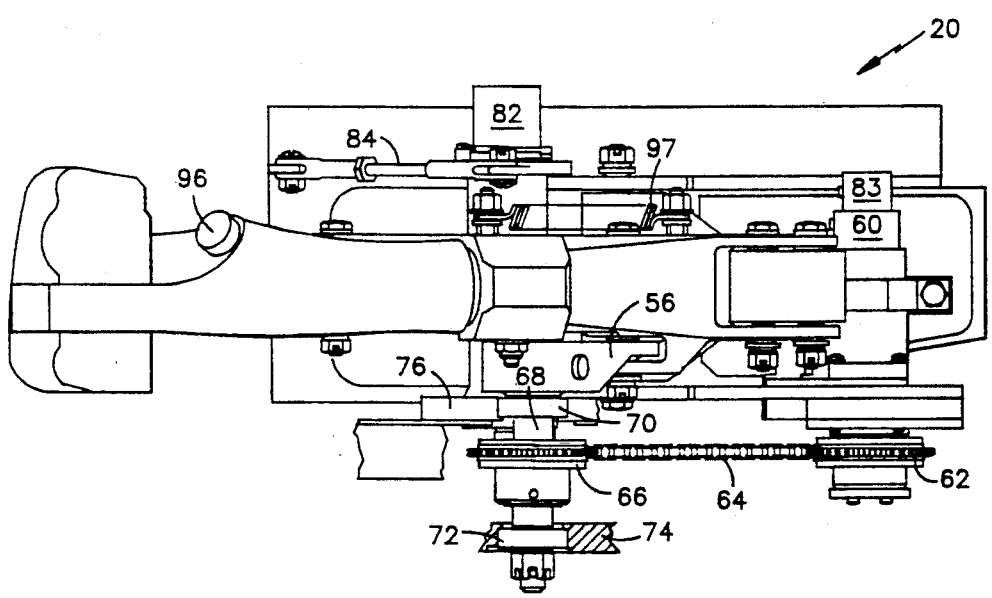
FIG. 7 is a top view of our improved collective stick, partially broken away for clarity.

While we have described our collective stick 20 as being motor driven in concert with side arm controller 18, in situations where collective stick 20 is not to be motor driven, it is possible to either actuate link assembly 30, and hence pilot grip 28, mechanically or to use a mechanical connection to produce a collective pitch signal when the pilot is actuating the collective stick 20 through operation of grip 28. Such a construction is shown in FIG. 8 in which a conventional series of links and crank members, such as links 98 and 100, which are pivotally connected at pivot points 102 and 104, respectively, to crank 106, which in turn is pivotally connected to a fixed point at pivot connection 108. Link 100 is pivotally connected at pivot point 110 to crank 112, which attaches to drive shaft 68 such that actuation of links and cranks 98 through 112 will cause input crank 56 to rotate and control collective stick 20. Similarly, when the pilot is utilizing grip 28 to control the helicopter in collective pitch, these series of links and cranks shown in FIG. 8 provide a collective stick position indicator in the cockpit or elsewhere, or to an appropriate control, to assist in the operation of the helicopter.

We claim:

1. A helicopter collective pitch control stick of the displacement type which occupies a minimum space envelope and whose pilot grip motion generates a large radius arc comprising:
   a. a pilot grip member;
   b. a linkage assembly connected to and operable by the pilot grip member and comprising;
      1) a first link having first and second ends, and with its first end pivotally connected to a fixed station;
      2) a second link having first and second ends, and with its second end integrally connected to the pilot grip member;
      3) a third link having first and second ends, and having its first end pivotally connected to the first end of the second link and its second end pivotally connected to the first link at a selected station between the first link's first and second ends; and
      4) a fourth link extending substantially parallel to the third link and having first and second ends and having its first end pivotally connected to the second link at a selected station between the first and second ends of the second link, and having its second end pivotally connected to the second end of the first link;
      said links being of selected length and the pivot connections between said links being selectively positioned so that the pilot grip member and the link assembly occupy a small space envelope and so that the motion of the pilot grip member generates an arc of large radius;
   c. a positioning means connected to said linkage assembly and operable to cause motion of the linkage assembly to selectively position the pilot grip member.

2. A helicopter control stick as in claim 1 and including biasing means operatively connected to the linkage assembly and biased to maintain the pilot grip member in its mid-collective pitch position thereby negating the weight and inertia of the linkage mechanism and the grip member, and further to provide increasing resistance as the pilot moves the collective stick from its mid-collective or trimmed position so as to provide the pilot feel for the amount of collective pitch being called for by the control stick.

3. A helicopter control stick as in claim 2 wherein the biasing means are preloaded coil springs operatively connected to the linkage assembly.

4. A helicopter control stick as in claim 3 and including stop members operatively associated with the linkage assembly and operable to prevent motion of the linkage assembly and the grip member beyond a selected lowest collective pitch position and a selected highest collective pitch position.

5. A helicopter control stick according to claim 1 wherein the positioning means is an input crank, and including mechanical means for positioning said input crank to control said collective pitch control stick position, or to provide a signal of collective pitch control stick position.

6. A helicopter control stick according to claim 1 and further including a force/displacement type side arm controller operable to produce collective pitch, cyclic pitch, and helicopter yaw command signal in the fly-by-wire mode, electronic control means connecting said side arm controller to said collective stick and operable to place the collective stick in a tracking mode in which the position of the collective stick is an indicator of the collective pitch command generated by the side arm controller and so that the tracking collective stick provides displacement feedback to the pilot.

7. A helicopter control stick as in claim 6 and including means to disengage the collective stick from the control of the side arm controller to permit pilot operation of the collective stick.

8. A helicopter control stick according to claim 6 wherein the connecting means includes an input crank member connected to the linkage assembly, and
   a. electric motor operatively connected to the crank to cause rotation thereof in either a clockwise or counterclockwise direction, and
   b. means to drive the motor as a function of the side arm controller collective pitch command to thereby place the collective stick in said tracking mode.

9. A helicopter control stick according to claim 8 wherein said motor drive means includes a motor driven gear operatively connected to said motor to be driven in either a clockwise or counterclockwise direction thereby, a drive gear operatively connected to the input crank to cause the crank to rotate in either a clockwise or counterclockwise direction, an idler gear connected to a rotational variable displacement transducer (RVDT) operable to transmit a collective gear position signal to the electronic control, a member engaging each of said gears so that rotation of the motor driven gear by the electric motor will position the input crank and therefore the collective stick, and also send at least one collective stick position signal back to the electronic control means.

10. A helicopter control stick according to claim 9 wherein said gear engaging means is a continuous chain, and including means to control the tension of said chain.

11. A helicopter control stick according to claim 8 and including pilot operable means to prevent the motor from driving the linkage assembly and grip member so as to place the collective pitch stick in manual mode with the motor operative to provide electric damping to control stick motion.

12. A helicopter control stick according to claim 8 and including a pilot operated trim command operable to cause the motor drive means to maintain the trimmed collective stick position to maintain a fixed collective pitch and so that motor torque provides resistance when the pilot attempts to move the collective stick from the trimmed position.

13. An operator control stick of the displacement type which occupies a minimum space envelope and whose grip motion generates a large radius arc comprising:
   a. an operator grip member; and b. a linkage assembly connected to and operable by the grip member and comprising:
  1) a first link having first and second ends, and with its first end pivotally connected to a fixed station;
  2) a second link having first and second ends, and with its second end integrally connected to the grip member;
  3) a third link having first and second ends, and having its first end pivotally connected to the first end of the second link and its second end pivotally connected to the first link at a selected station between the first link's first and second ends; and
  4) a fourth link extending substantially parallel to the third link and having first and second ends and having its first end pivotally connected to the second link at a selected station between the first and second ends of the second link, and having its second end pivotally connected to the second end of the first link;
said links being of selected length and the pivot connections between said links being selectively positioned so that the grip member and the link assembly occupy a small space envelope and so that the motion of the grip member generates an arc of large radius.

14. A control stick according to claim 13 and further including means connected to said linkage assembly and operable to either cause motion of the linkage assembly to selectively position the grip member, or generate a grip member position indicator signal.

15. A control stick as in claim 13 and including biasing means operatively connected to the linkage assembly and biased to maintain the operator grip member in its mid position thereby negating the weight and inertia of the linkage mechanism and the grip member, and further to provide increasing resistance as the operator moves the control stick from its mid position so as to provide the operator feel for the amount of change being called for by the control stick.

16. A control stick as in claim 15 wherein the biasing means are preloaded coil springs operatively connected to the linkage assembly.

17. A control stick according to claim 15 and wherein the linkage assembly motion causing means is an input crank, and an electric motor operable to rotate such input crank to thereby actuate said linkage assembly to move said control stick so that the operator grip member generates a large radius arc.

18. A helicopter control stick according to claim 15 and wherein said linkage assembly motion causing means is an input crank, and mechanical means to either impart motion to said input crank to cause said linkage assembly to move said control stick, or to serve as a position indicator of control stick position.

* * * * *

UNITED STATES PATENT AND TRADEMARK OFFICE
CERTIFICATE OF CORRECTION

PATENT NO. : 5,156,363
DATED : October 20, 1992
INVENTOR(S) : Steven C. Cizewski, et al It is certified that error appears in the above-indentified patent and that said Letters Patent is hereby corrected as shown below:

Claim 1, column 7, line 45, after "radius;" add --and--

Claim 5, column 8, line 1, after "claim" add --3--

Claim 18, column 10, line 22, delete "helicopter"

Signed and Sealed this

Twenty-fifth Day of January, 1994

Attest:

BRUCE LEHMAN

*Attesting Officer*    *Commissioner of Patents and Trademarks*